(No Model.) 3 Sheets—Sheet 2.

W. CORLISS.
MECHANISM FOR VARYING SPEED.

No. 569,369. Patented Oct. 13, 1896.

WITNESSES:
M. F. Bligh.
Chas. H. Luther Jr

INVENTOR:
William Corliss,
by Joseph A. Miller & Co.,
attys.

THE NORRIS PETERS CO., PHOTO-LITHO., WASHINGTON, D. C.

(No Model.) 3 Sheets—Sheet 3.
W. CORLISS.
MECHANISM FOR VARYING SPEED.
No. 569,369. Patented Oct. 13, 1896.
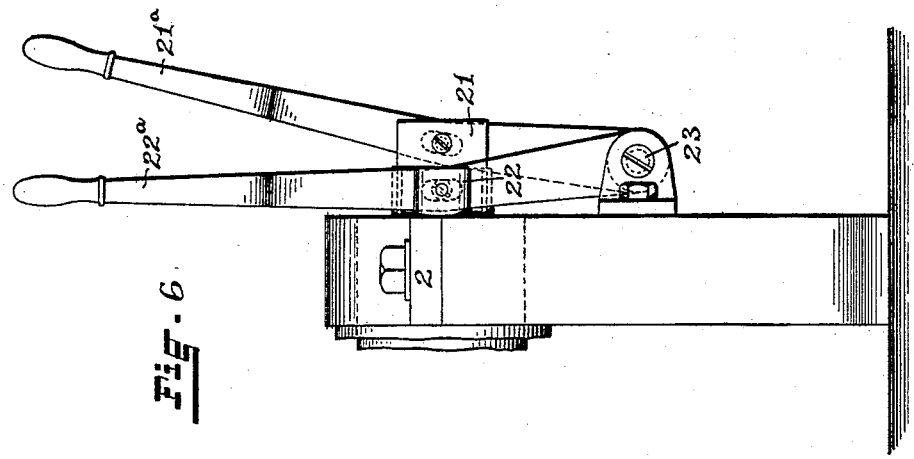
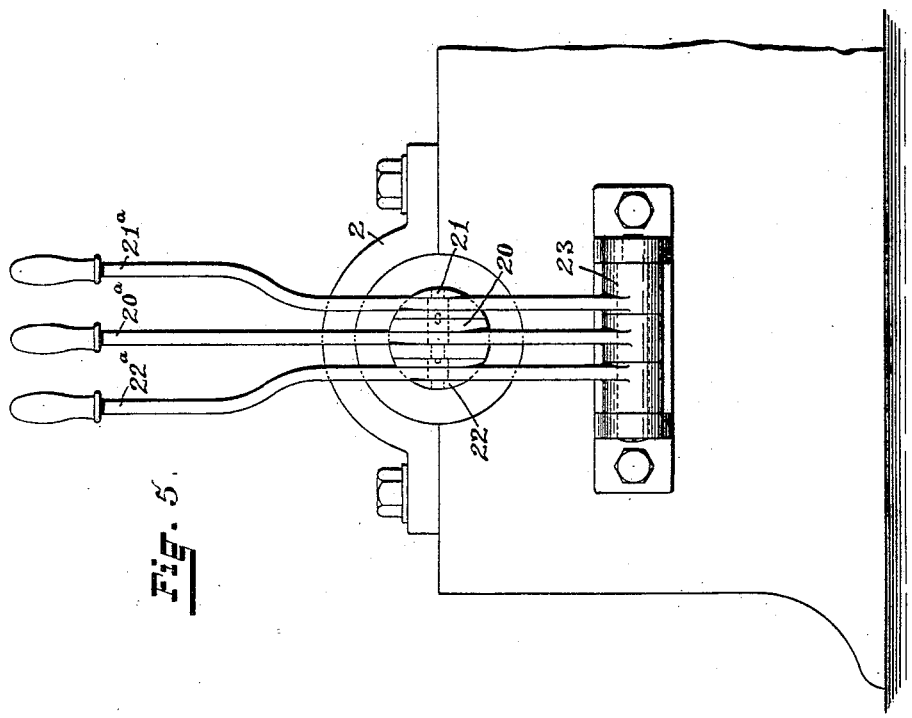
WITNESSES:
M. F. Bligh.
Chas. H. Luther Jr.
INVENTOR:
William Corliss,
by Joseph A. Miller & Co.,
att'ys.

UNITED STATES PATENT OFFICE.

WILLIAM CORLISS, OF PROVIDENCE, RHODE ISLAND.

MECHANISM FOR VARYING SPEED.

SPECIFICATION forming part of Letters Patent No. 569,369, dated October 13, 1896.

Application filed November 11, 1895. Serial No. 568,576. (No model.)

*To all whom it may concern:*

Be it known that I, WILLIAM CORLISS, of the city of Providence, in the county of Providence and State of Rhode Island, have invented certain new and useful Improvements in Mechanism for Transmitting Power at Varying Speeds; and I hereby declare that the following is a full, clear, and exact description of the same, reference being had to the accompanying drawings, forming part of this specification.

This invention has reference to mechanism for the transmission of motive power or force from any prime motor or source of motive power to any machine at different speeds.

When a machine is set in motion, the inertia of all its moving parts has to be overcome and motion imparted to all the moving parts. When parts of the machine are heavy and the machine is designed to have these heavy parts run at high speed, a very great strain has to be exerted on the parts which transmit the power to disturb the state of rest and impart the high speed to the moving parts. Other machines require accurate adjustment of the coacting parts to secure the desired result, and still other machines require to be driven at varying speeds.

The object of the invention is to produce a simple mechanism by which the power from a prime motor transmitted to one shaft may be conveyed to a machine at greatly-varying speed, so that the machine may be started at a slow speed and the speed of the machine increased at will.

Another object of the invention is to so construct a mechanism for transmitting power at varying speeds that the speed of the machine may be increased or diminished by the operative while the machine is in motion.

The invention consists in the peculiar and novel construction and arrangement of the parts whereby the speed of the machine is varied, as will be more fully set forth hereinafter, and pointed out in the claims.

Figure 1:
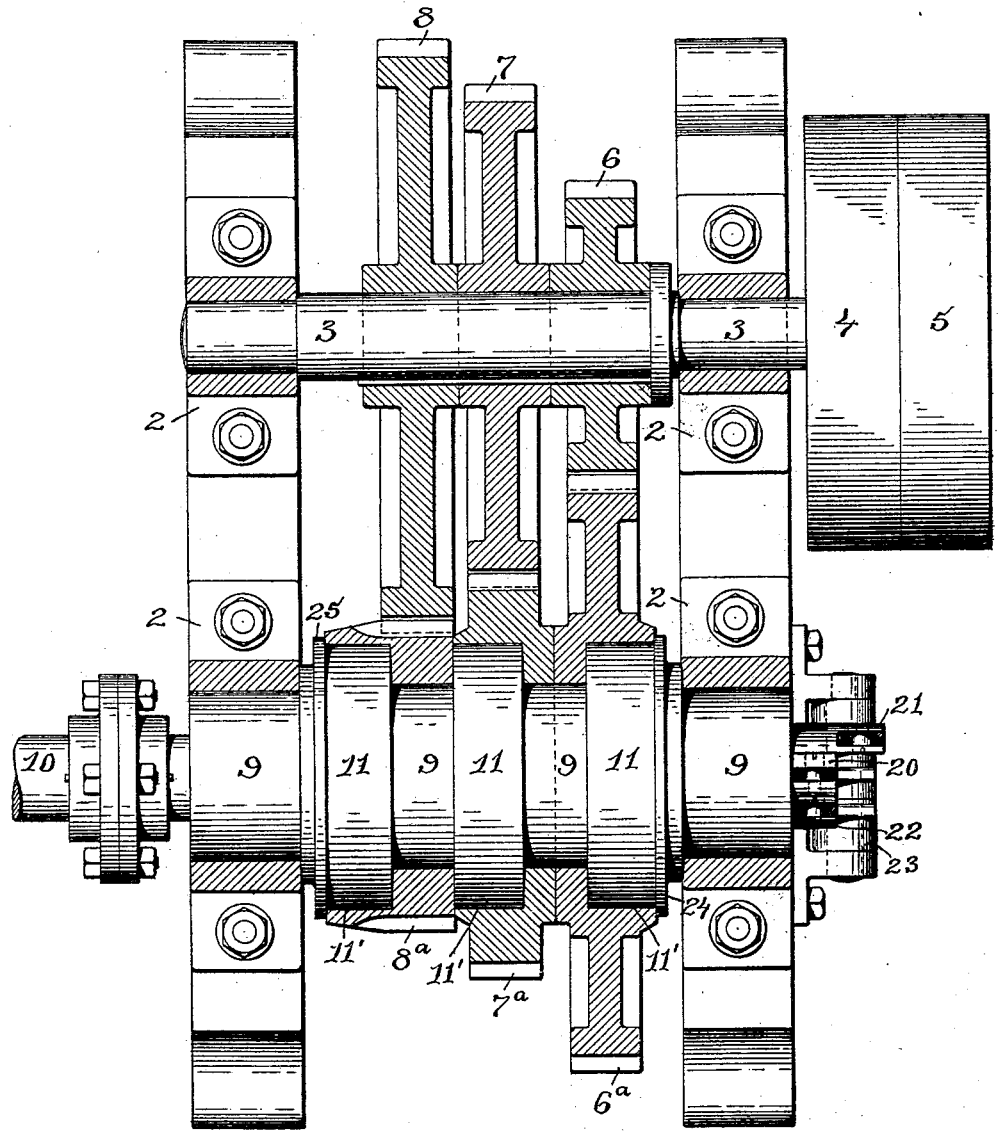
Figure 2:
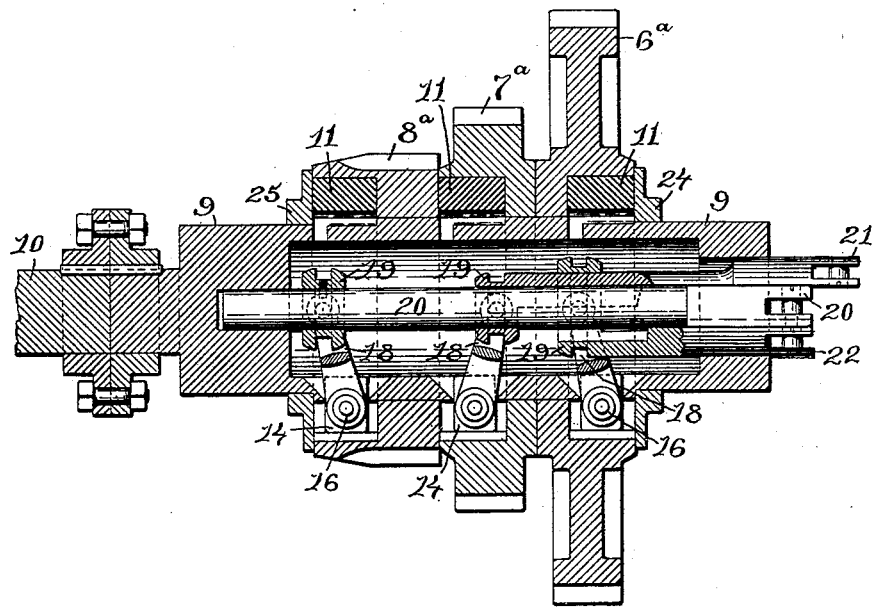
Figure 3:
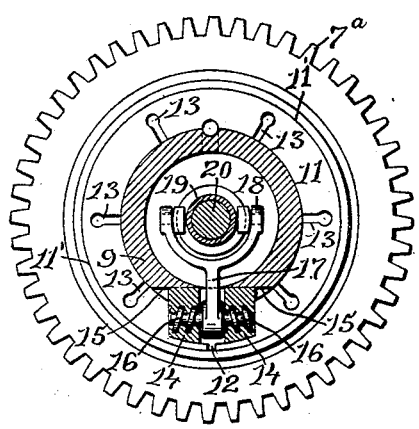
Figure 4:
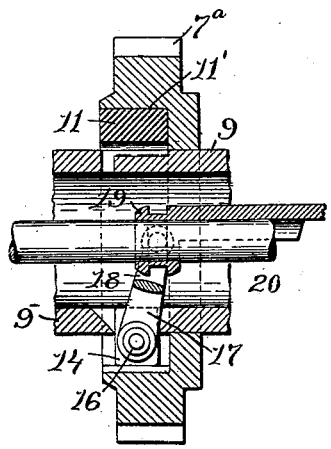

Figure 1 is a top view, partly in section, showing the shaft driven from a prime motor and the driving-shaft communicating power to the machine, each provided with a series of gears and mechanism for connecting and disconnecting the gears with one of the shafts. Fig. 2 is a sectional view of the shaft carrying the loose gears, showing the mechanism for connecting and disconnecting the gears. Fig. 3 is a transverse sectional view of the shaft of Fig. 2, showing one gear and the mechanism for connecting the same. Fig. 4 is a sectional view at right angle to Fig. 3. Fig. 5 is a side view of the bearing-block, showing the hand-levers for operating the connecting mechanism; and Fig. 6 is an end view of the same.

Similar numerals of reference designate corresponding parts in all the figures.

In carrying out my invention I support two shafts in suitable bearings. One of these shafts is driven by belting, gearing, or otherwise from any prime motor or source of power. The other shaft is connected with the machine to which the power under varying speed is to be transmitted. On each one of these two shafts I mount a series of gears of gradually-increasing diameter, so arranged that the gear of the least diameter on one shaft meshes with the gear of the greatest diameter of the other shaft. The gears on one of the shafts are secured permanently to the shaft, the gears on the other shaft are loose on the shaft, and mechanism is used to connect any one of these gears to the shaft. The number of gears connected with each shaft may be changed to suit the desired variation in speed required, and either one of the two shafts may be constructed to receive the loose gears and the mechanism for connecting the same to the shaft.

In the drawings I have shown three gears connected with each shaft. I have placed the fixed gears on the shaft driven by a prime motor and the loose gears with the connecting mechanism on the shaft connected with the machine to be driven. In this, the form selected to illustrate my invention, 2 2 are the fixed bearings in which the shafts are journaled. 3 indicates the driving-shaft. It is provided with the driving-pulley 4, secured to the shaft 3, and the loose pulley 5. On the shaft 3 are secured, by means of a key and spline or by any other approved means, the gears 6, 7, and 8. The driven shaft 9 is connected with the driving-shaft 10 of the machine. On this shaft 9 are mounted loose, so as to turn independent of the shaft, the gears 6ª, 7ª, and 8ª, so that the gear 6ª intermeshes with the gear 6, 7ª with 7, and 8ª with the gear 8. The hub of each one of these gears 6ª, 7ª, and 8ª is recessed to receive the ring 11. This ring is turned so as to fit in the recess of the hub with a loose sliding fit. The ring 11 is cut open at 12, and it is weakened at practically equidistant points by the slots 13, so as to permit of a slight expansion of the ring, by which the outer surface of the ring 11 may be brought into contact with the inner circular surface of the recess 11'.

On each side of the point 12, where the ring 11 is cut open, the blocks 14 are set into a recess formed at each end of the ring 11. These blocks 14 slide in a recess 15, cut into the outer surface of the shaft 9 transversely to the axis of the shaft. The blocks 14 are provided with screw-threads inclined in opposite directions. The double-ended screw 16 is secured to the lever 17, the bifurcated end 18 of which is connected with the grooved sleeve 19, which is secured to or mounted on the rod 20, and can be moved longitudinally along the axis of the shaft 9. This shaft 9 is tubular for such portion of its length as is required to support and operate to connect and disconnect the loose gears.

The means for connecting and disconnecting the loose gears (more particularly shown in Figs. 3 and 4 and above described) are used on all the gears 6ª, 7ª, and 8ª. The grooved sleeve 19 of the gear 8ª is secured to the rod 20, the grooved sleeve 19 for the gear 7ª is connected with the rod 21, and the grooved sleeve 19 for operating the ring of the gear 6ª is connected with the rod 22. The ends of the rods 20, 21, and 22 extend beyond the end of the shaft 9, where they are pivotally secured, respectively, to the hand-levers 20ª, 21ª, and 22ª, all supported on the fulcrum-bearing 23, as shown in Fig. 5, and also in Fig. 6, where the hand-lever 21ª is shown drawn out so as to correspond with Fig. 2, in which the rod 21 is drawn out, and the gear 7ª is shown connected with the shaft 9, so as to rotate with the same.

In the drawings the ring 11 and the double screw 16 are shown, and the same are heretofore described as spreading the ring 11 to connect the same with the gear, and in practice I prefer to so operate the ring; but a spring-ring may be used to bear against the inner surface of the recess in the gear by its resiliency and be drawn together at the split by having the operation of the screw 16 reversed.

To retain the gears 6ª, 7ª, and 8ª while revolving loose on the shaft 9 in their relative positions, I secure to the shaft 9 the flanged rings 24 and 25, and thereby hold the gears against lateral movement.

I will now more fully describe the operation of my improved mechanism, and for the purpose of illustrating its peculiar capacity I will assume that the pulleys 4 and 5 are connected by means of a belt with the driving-pulley on a shaft driven at a fixed speed by some prime motor, and that the shaft 10 is the driving-shaft of a rotary power printing-press, and, further, that the gears 6ª, 7ª, and 8ª are loose on the shaft 9, the rod 21 being pushed in on a line with the rods 20 and 22. When now the belt is placed on the driving-pulley 4, the shaft 3, with the gears 6, 7, and 8, will rotate and carry the gears 6ª, 7ª, and 8ª around the shaft 9 without communicating motion to the shaft 9 or to the printing-machine. For the purpose of ascertaining that all parts of the printing-machine coöperate in the desired manner the machine is to be started slowly. To this end hand-lever 22ª is drawn outward, and with the same the rod 22 and grooved sleeve 19. This operates the lever 17, and the double screw 16 forces the split end of the ring 11 apart and against the circular face of the recess 11' in the gear 6ª, connecting the said gear 6ª with the shaft 9. The power is now transmitted from the small gear 6 through the larger gear 6ª and the shafts 9 and 10 to the printing-machine, so that for every two revolutions of the shaft 3 the shafts 9 and 10 make only one revolution. By now drawing out the hand-lever 21ª and with it the rod 21 and at the same time pushing inward the hand-lever 22ª and rod 22 the gear 7ª is connected with the shaft 9 and the gear 6ª is disconnected. The speed of the driving-shaft 10 and the printing-machine is materially increased, and when it is found that all parts properly coöperate and it is desirable to increase the speed of the machine the hand-lever 21ª and with it the rod 21 are pushed in, while the hand-lever 20ª and rod 20 are drawn out and the gear 8ª is connected with the shaft 9, and the power is now transmitted from the shaft 3 through the large gear 8 and small gear 8ª to the shaft 9 and the printing-machine is run at the highest speed obtainable by the power-transmitting device herein shown. It is evident to any one skilled in the art that by the addition of differential gears a greater range of speed can be secured and that it is practical by this mechanism to start the shaft 9 at one-tenth the speed of the shaft 3 and gradually increase the speed of the shaft 9 to ten times the speed of the shaft 3 and vary the speed of the shaft 9 at pleasure while the printing or other machine connected therewith is running.

Having thus described my invention, I claim as new and desire to secure by Letters Patent—

1. The clutch mechanism herein described, the same consisting of a split ring, adapted to bear against the cylindrical face of a recess in the wheel, loose on the shaft, a tubular shaft, a right and left hand screw connected to a lever extending through an opening in the wall of the tubular shaft, a grooved sleeve connecting with the screw-operating lever, and the mechanism for operating the grooved sleeve, whereby the movement of the sleeve operates the lever to turn the screw and thereby force the split end of the ring apart and the outer surface of the ring against the cylindrical surface of the recess in the wheel and connect the wheel so as to rotate with the shaft, as described.

2. In mechanism for transmitting power at varying speeds, the combination, with the shaft 3, the series of graduated gears connected therewith, the tubular shaft 9, and the series of gears mounted thereon and provided each with a cylindrical recess, of the split rings 11, 11, the blocks 14 14, the double-ended screws 16 16, the levers 17 17 provided with the bifurcated ends 18, the rods 20, 21 and 22 each provided with a grooved sleeve 19 and the hand-levers connected therewith, whereby any one of the gears mounted on the shaft 9 may be connected with or disconnected from the shaft 9 and the speed of the shaft varied, as described.

In witness whereof I have hereunto set my hand.

WILLIAM CORLISS.

Witnesses:
 JOSEPH A. MILLER,
 HENRY J. MILLER.